United States Patent Office 3,434,822
Patented Mar. 25, 1969

3,434,822
m-UREIDOPHENYL CARBAMATES AS HERBICIDES
Kenneth R. Wilson, Tonawanda, and Kenneth L. Hill, Middleport, N.Y., assignors to FMC Corporation, New York, N.Y., a corporation of Delaware
No Drawing. Continuation-in-part of application Ser. No. 354,153, Mar. 23, 1964. This application Feb. 16, 1965, Ser. No. 433,157
Int. Cl. A01n 9/20; C07c 125/06, 127/18
U.S. Cl. 71—106      12 Claims

ABSTRACT OF THE DISCLOSURE

Meta-ureidophenyl carbamates, in which both the urea and carbamate groups are substituted, are effective as both pre-emergence and post-emergence herbicides. The synthesis and properties of these new compounds are given, and herbicidal activity against a variety of plants is illustrated.

---

This application is a continuation-in-part of copending application Ser. No. 354,153, filed Mar. 23, 1964 now abandoned.

This invention relates to novel herbicidal compounds, to new herbicidal compositions, and to a new method for the control of undesired plant growth, both pre-emergently and post-emergently, by application of said new and useful herbicidal compositions.

The novel herbicidal compounds of this invention are the m-ureidophenyl carbamates of the following structure:

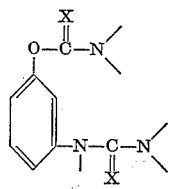

wherein X is oxygen or sulfur. The free valences of the above compound can be variously substituted, the important moiety being the m-ureidophenyl carbamate nucleus as shown above.

A particularly useful group of compounds of this invention are the m-ureidophenyl N-substituted-carbamates represented by the generic formula:

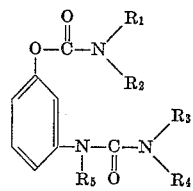

wherein $R_1$ and $R_3$ are each an aliphatic radical of one to about six carbon atoms, which aliphatic radical may be cyclic, straight or branched chain, saturated or unsaturated; $R_2$ and $R_4$ are each hydrogen or an aliphatic radical of one to about six carbon atoms, cyclic, straight or branched chain, saturated or unsaturated; and $R_5$ is hydrogen or methyl. The substituents $R_1$ and $R_2$ may also form a heterocyclic ring with the carbamate nitrogen, which heterocyclic ring may also contain oxygen.

Certain preferred herbicidal compositions of this invention are represented by the generic formula:

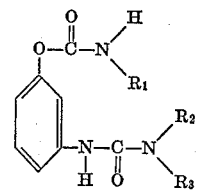

wherein $R_1$ is an aliphatic radical of one to about six carbon atoms, which aliphatic radical may be cyclic, straight or branched chain, and saturated or unsaturated; $R_2$ is an aliphatic radical of one to about six carbon atoms, cyclic, straight or branched chain, saturated or unsaturated; and $R_3$ is hydrogen, methyl or ethyl.

The novel compounds of this invention may be prepared by methods employed for the synthesis of carbamates and of urea derivatives. For example, N-monosubstituted-carbamic acid esters may be prepared by reacting an appropriate m-ureidophenol with an alkyl isocyanate. This reaction may be catalyzed by materials such as triethylamine, 1,4-diazabicyclo(2.2.2)octane, dibutyltin diacetate, dimethyltin dichloride and dibutylbis(decylthio)tin. N,N-disubstituted- and N-monosubstituted-carbamic acid esters may be prepared by treating the sodium salt of an appropriate m-ureidophenol with an N-monosubstituted- or N,N-disubstituted-carbamoyl halide. The intermediate m-ureidophenols may be prepared by treatment of m-aminophenol or an N-monosubstituted-m-aminophenol with an equimolar amount of an alkyl isocyanate to produce an m-(3-monosubstituted-ureido)phenol or an m-(1,3-disubstituted-ureido)-phenol, or by treatment of an m-aminophenol with an N-monosubstituted- or N,N-disubstituted-carbamoyl halide in the presence of a suitable acid acceptor.

m-Ureidophenyl N-substituted-carbamates may also be prepared by first converting an appropriate m-ureidophenol to its chloroformic acid ester by treatment with phosgene, then allowing the chloroformate to react with a primary or secondary amine, including heterocyclic amines such as piperidine and morpholine.

Another method useful for the preparation of m-ureidophenyl N-substituted-carbamates involves the treatment of an m-aminophenyl N-substituted-carbamate with an alkyl isocyanate or with an N-monosubstituted- or N,N-disubstituted-carbamoyl halide. The intermediate m-aminophenyl N-substituted- or N,N-disubstituted-carbamates may be obtained by reduction of the corresponding m-nitrophenyl carbamates which, in turn, may be obtained by treatment of m-nitrophenol with an alkyl isocyanate or with an N-monosubstituted- N,N-disubstituted-carbamoyl halide. Useful m-nitrophenyl N-substituted-carbamates may also be prepared by conversion of m-nitrophenol to its chloroformic acid ester with phosgene and reaction of the m-nitrophenyl chloroformate with a primary or secondary amine. These procedures are particularly useful for the preparation of m-ureidophenyl carbamates having higher molecular weight substituents on the urea nitrogen.

Other methods useful for the preparation of m-ureidophenyl N-substituted-carbamates include the reaction of a m-ureidophenol with an alkyl N-substituted-carbamate or a N-substituted-urea, to yield a m-ureidophenyl N- substituted-carbamate and an alcohol or ammonia, as described in U.S. Patent No. 2,871,259. In these instances the reaction can be driven to completion by removal of the volatile by-product. Similarly, the exchange reaction between an aliphatic acid ester of a m-ureidophenol and an alkyl N-substituted-carbamate yields a m-ureidophenyl N-substituted-carbamate and an aliphatic acid ester; again the reaction may be driven to completion by removal of the volatile aliphatic acid ester.

Treatment of a m-isocyanatophenyl N-substituted-carbamate with a suitable primary or secondary amine may also be employed to yield m-ureidophenyl N-substituted-carbamates. The intermediate m-isocyanatophenyl N-substituted-carbamate may be obtained by treatment of a m-aminophenyl N-substituted-carbamate with phosgene.

Another intermediate useful for the preparation of m-ureidophenyl N-substituted-carbamates is m-isocyanatophenyl chloroformate. This intermediate may be prepared by reaction of m-aminophenol with two moles of phosgene. m-Isocyanatophenyl chloroformate produces m-ureidophenyl N-substituted-carbamates by reaction with primary or secondary amines.

The selection of the reactants and conditions for the synthesis of any specific compound of this invention will of course depend upon the structure of the final compound desired. Reactions of amines and phenols with phosgene, chloroformates, carbamoyl halides, and other reagents described herein above are well known in the art. For example, a procedure for the m-aminophenol reaction with isocyanate is described by M. J. Kolbezen, R. L. Metcalf, and T. R. Fukuto, J. Agr. and Food Chem. 2, 864–70 (1954). The acylation of m-aminophenol may be carried out by procedures for the preparation of amides from acyl halides, such as are described by L. C. Raiford and K. Alexander, J. Org. Chem. 5, 300–12 (1940).

Obviously the reactants selected will depend on the final product desired, as will the choice of synthetic procedure used. The m-ureidophenyl carbamates thus produced are novel compounds, and are characterized by excellent herbicidal properties.

For herbicidal applications, the active m-ureidophenyl carbamates as above defined are formulated into herbicidal compositions, by admixture, in herbicidally effective amounts, with the adjuvants and carriers normally employed for facilitating the dispersion of active ingredients for agricultural applications, recognizing the fact that the formulation and mode of application of a toxicant may affect the activity of the material in a given application. Thus, these active herbicidal compounds may be formulated as granules of relatively large particle size, as powdery dusts, as wettable powders, as emulsifiable concentrates, as solutions or as any of several other known types of formulations, depending on the desired mode of application.

For pre-emergence application these herbicidal compositions are usually applied either as sprays, dusts, or granules in the area in which suppression of vegetation is desired. For post-emergence control of established plant growth, sprays or dusts are most commonly used. These formulations may contain as little as 0.5% to as much as 95% or more by weight of active ingredient.

Dusts are free flowing admixtures of the active ingredient with finely divided solids such as talc, natural clays, kieselguhr, flours such as walnut shell and cottonseed flours, and other organic and inorganic solids which act as dispersants and carriers for the toxicant; these finely divided solids have an average particle size of less than about 50 microns. A typical dust formulation, useful herein, is one containing 1.0 part of the m-ureidophenyl carbamate and 99.0 parts of talc.

Wettable powders, also useful formulations for both pre- and post-emergence herbicides, are in the form of finely divided particles which disperse readily in water or other dispersant. The wettable powder is ultimately applied to the soil either as a dry dust or as an emulsion in water or other liquid. Typical carriers for wettable powders include Fuller's earth, kaolin clays, silicas, and other highly absorbent, readily wet inorganic diluents. Wettable powders normally are prepared to contain about 5–80% of active ingredient, depending on the absorbency of the carrier, and usually also contain a small amount of a wetting, dispersing or emulsifying agent to facilitate dispersion. For example, a useful wettable powder formulation contains 80.8 parts of the m-ureidophenyl carbamate, 17.9 parts of Palmetto clay and 1.0 part of sodium lignosulfonate and 0.3 part of sulfonated aliphatic polyester as wetting agents.

Other useful formulations for herbicidal applications are the emulsifiable concentrates, which are homogeneous liquid or paste compositions which are dispersible in water or other dispersant, and may consist entirely of the m-ureidophenyl carbamate with a liquid or solid emulsifying agent, or may also contain a liquid carrier, such as xylene, heavy aromatic naphthas, isophorone and other non-volatile organic solvents. For herbicidal application these concentrates are dispersed in water or other liquid carrier, and normally applied as a spray to the area to be treated. The percentage by weight of the essential active ingredient may vary according to the manner in which the composition is to be applied, but in general comprises 0.5 to 95% of active ingredient by weight of the herbicidal composition.

Typical wetting, dispersing or emulsifying agents used in agricultural formulations include, for example, the alkyl and alkylarlyl sulfonates and sulfates and their sodium salts; polyhydric alcohols; and other types of surface active agents, many of which are available in commerce. The surface active agent, when used, normally comprises from 1% to 15% by weight of the herbicidal composition.

Other useful formulations for herbicidal applications include simple solutions of the active ingredient in a dispersant in which it is completely soluble at the desired concentration, such as acetone, alkylated naphthalenes, xylene or other organic solvents. Granular formulations, wherein the toxicant is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier, such as the Freons, may also be used.

The preparation, properties, and herbicidal activity of representative herbicidal compounds of this invention is illustrated further in the following examples. All parts and percentages are by weight where not otherwise indicated, and all temperatures are in degrees centigrade.

EXAMPLE 1

Preparation and herbicidal properties of m-(3,3-dimethylureido)phenyl N-methylcarbamate The intermediate 3-(m-hydroxyphenyl)-1,1-dimethylurea was prepared as follows: A solution of 22.9 parts of m-aminophenol and 11.8 parts of dimethylcarbamoyl chloride in 200 parts of 1,2-dimethoxyethane was allowed to stand at room temperature overnight. The semi-solid mass was diluted with 100 parts of water, filtered and the solid washed with water. After drying in vacuum, 12.0 parts of crude 3-(m-hydroxyphenyl)-1,1-dimethylurea, melting at 198.5–200°, were obtained. Recrystallization from acetonitrile gave pure white cubes melting at 200–1° C.

*Analysis.*—Calc'd for $C_9H_{12}N_2O_2$: C, 60.0; H, 6.7; N, 15.5. Found: C, 60.1; H, 6.6; N, 15.4.

This product was reacted with methyl isocyanate as follows: To a solution of 18.0 parts of 3-(m-hydroxyphenyl)-1,1-dimethylurea in 190 parts of N,N-dimethylformamide was added two to three drops of triethylamine. Methyl isocyanate (8.0 parts) was added dropwise with stirring, the mixture stirred for two hours and allowed to stand at room temperature overnight. The solvent and excess methyl isocyanate were removed under vacuum, the residue was washed with water, filtered and dried to yield 20.1 parts of crude m-(3,3-dimethylureido) phenyl N-methylcarbamate, melting at 154–57°. Recrystallization from ethanol gave a product melting at 157.5–158.5°.

*Analysis.*—Calc'd for $C_{11}H_{15}N_3O_3$: C, 55.68; H, 6.37; N, 17.71. Found: C, 55.33; H, 6.36; N, 17.49.

The pre-emergence herbicidal activity of m-(3,3-dimethylureido)phenyl N-methylcarbamate was demonstrated as follows: In flat pans was placed, to a depth of three inches, a 1:1 mixture of silt-loam and sandy-loam soil. In the soil were then planted seeds of pigweed (*Amaranthus retroflexus*), mustard (*Brassica juncea*), crabgrass (*Digitaria sanguinalis*), German hay millet (*Setaria italica*), flax (*Linum usitatissimum*), chickweed (*Cerastium vulgatum*), and lettuce (*Lactuca sativa*), at a depth of one-fourth to one-half inch. These plant species are representative of a broad spectrum of plant species. As soon as the seeds were planted and the flats watered, the toxicant was sprayed on the soil as an acetone-water solution, at rates equivalent to varying dosages of toxicant per acre, as shown in Table 1 below. Both the treated flats and untreated controls were held in the greenhouse for two to three weeks, after which time the performance of the toxicant was assessed in terms of percent kill with respect to the untreated control. Results are presented in the following table:

TABLE 1.—PRE-EMERGENCE HERBICIDAL ACTIVITY OF m-(3,3 - DIMETHYLUREIDO)PHENYL N - METHYLCARBAMATE

| | Percent Kill | |
|---|---|---|
| | 1.5 lb./acre | 6 lb./acre |
| Test Plant Species: | | |
| Crabgrass | 100 | 100 |
| Flax | 100 | 100 |
| German hay millet | 100 | 100 |
| Mustard | 100 | 100 |
| Chickweed | 100 | 100 |
| Pigweed | 100 | 100 |
| Lettuce | 100 | 100 |

The striking effectiveness observed at the substantially reduced dosage of 1.5 lb./acre indicates unusual pre-emergence effectiveness of the subject herbicide.

The post-emergence herbicidal activity of m-(3,3-dimethylureido)phenyl N-methylcarbamate was demonstrated as follows: In sterile loam soil were planted seeds of corn (*Zea mays*), cotton (*Gossypium hirsutum*), peanuts (*Arachis hypogaea*), soybeans (*Glycine max*), and oats (*Avena sativa*), at a depth of approximately one inch, and seeds of flax (*Linum usitatissimum*), carrots (*Daucus carota*), lettuce (*Lactuca sativa*), mustard (*Brassica juncea*), crabgrass (*Digitaria sanguinalis*), pigweed (*Amaranthus retroflexus*), and barnyard grass (*Echinochloa crusgalli*) at a depth of one-fourth to one-half inch. The flats were watered, and the seeds allowed to grow in the greenhouse for two weeks. Maintaining untreated controls, the stand of plants was then sprayed with a solution in aqueous acetone of m-(3,3-dimethylureido)phenyl N-methylcarbamate, in a volume of acetone-water equivalent to 40 gallons per acre, at rates equivalent to various dosages of toxicant per acre. After a period of sixteen days the number of surviving plants were counted, and the percent kill with respect to the untreated controls was determined. Results are presented in Table 2 below, for dosages of 1.5 and 6 pounds per acre:

TABLE 2.—POST-EMERGENCE HERBICIDAL ACTIVITY OF m-(3,3-DIMETHYLUREIDO)PHENYL N-METHYLCARBAMATE

| | Percent Kill | |
|---|---|---|
| | 1.5 lb./acre | 6 lb./acre |
| Test Plant Species: | | |
| Crabgrass | 95 | 100 |
| Mustard | 100 | 100 |
| Lettuce | 100 | 100 |
| Flax | 100 | 100 |
| Pigweed | 100 | 100 |
| Corn | ² 0 | ¹ 0 |
| Oats | 100 | 100 |
| Peanuts | ¹ 80 | 100 |
| Cotton | 100 | 100 |
| Soybeans | 100 | 100 |
| Barnyard grass | 90 | 100 |
| Carrots | 100 | 100 |

¹ Plants injured, probably will not recover.
² Plants injured, probably will recover.

The outstanding effectiveness of this herbicide in post-emergence applications even at low dosages shows an unusual activity in the control of plant growth.

The following group of examples, Examples 2 through 8, illustrates novel compounds embodying variation in the carbamate moiety of the m-ureidophenyl carbamates described herein. The herbicidal properties of these compounds, determined following the general procedures described in Example 1, are shown in Tables 3 and 4.

EXAMPLE 2.

Preparation and herbicidal properties of m-(3,3-dimethylureido)phenyl N,N-dimethylcarbamate The sodium salt of 3-(m-hydroxyphenyl)-1,1-dimethylurea was prepared as follows: A suspension of 180 g. of 3-(m-hydroxyphenyl)-1,1-dimethylurea in 900 ml. of methanol was added to 54 g. of sodium methoxide in 900 ml. of methanol. The methanol was distilled under vacuum and the solid was washed twice with benzene.

This product was reacted with dimethylcarbamoyl chloride as follows: Dimethylcarbamoyl chloride (12.9 g.) was added to a stirred suspension of 20.2 g. of the sodium salt of 3-(m-hydroxyphenyl)-1,1-dimethylurea in 150 ml. of anhydrous acetonitrile. The reaction mixture was allowed to stand at room temperature for several days. The sodium chloride which had precipitated was removed by filtration and the filtrate was concentrated to dryness under vacuum. The crude solid residue was washed with water, dried and recrystallized from toluene to yield m-(3,3 - dimethylureido)phenyl N,N - dimethylcarbamate melting at 122.5–123.5°.

EXAMPLE 3 m-(3,3-dimethlyureido)phenyl N-ethylcarbamate

A mixture of 9.0 g. of 3-(m-hydroxyphenyl)-1,1-dimethylurea, 4.0 g. of ethyl isocyanate and five drops of triethylamine was stirred and heated for three hours on a water bath at 70°. The crude material, which solidified on cooling, was recrystallized from ethanol to yield m-(3,3-dimethylureido)-phenyl N-ethylcarbamate, melting at 143–4°.

*Analysis.*—Calc'd for $C_{12}H_{17}N_3O_3$: C, 57.35; H, 6.82; N, 16.72. Found: C, 57.35; H, 6.91; N, 17.00.

EXAMPLE 4 m-(3,3-dimethylureido)phenyl N-isopropylcarbamate

Following the procedure of Example 1, 3-(m-hydroxyphenyl)-1,1-dimethylurea was reacted with isopropyl isocyanate, to yield m-(3,3-dimethylureido)phenyl N-isopropylcarbamate, which on recrystallization from aqueous ethanol melted at 164–164.5°.

*Analysis.*—Calc'd for $C_{13}H_{19}N_3O_3$: C, 58.85; H, 7.22; N, 15.84. Found: C, 58.78; H, 6.96; N, 15.74.

EXAMPLE 5 m-(3,3-dimethylureido)phenyl N-isobutylcarbamate

A solution of 6.8 g. of isobutylamine in 50 ml. of ethyl acetate was added dropwise to a stirred solution of 11.4 g. of crude m-(3,3-dimethylureido)phenyl chloroformate in 200 ml. of ethyl acetate at room temperature. Precipitation of a solid commenced shortly after the first few drops were added. When the amine addition was complete, the slurry was stirred for two to three hours. The precipitate, which consisted of the desired product and the amine hydrochloride, was removed by filtration. The solid was washed with water to remove the amine hydrochloride, then dried. A yield of 3.1 g. of material melting at 177–8° was obtained. Recrystallization from ethanol produced pure m-(3,3-dimethylureido)phenyl N-isobutylcarbamate, melting at 184–5°.

*Analysis.*—Calc'd for $C_{14}H_{21}N_3O_3$: C, 60.19; H, 7.58; N, 15.04. Found: C, 58.89; H, 7.46; N, 14.89.

EXAMPLE 6 m-(3,3-dimethylureido)phenyl N-tert-butylcarbamate

In a small Erlenmeyer flask were placed 9.0 g. of 3-(m-hydroxyphenyl)-1,1-dimethylurea, 5.35 g. of tert-butyl isocyanate and 1.7 g. of dibutyltin diacetate. The reactants were stirred, and the flask stoppered and heated for 24 hours in a hot water bath at 60–70°. The mixture was washed with hexane, filtered and the solid recrystallized from ethyl acetate to yield 7.1 g. of m-(3,3-dimethylureido)phenyl N-tert-butylcarbamate, melting at 163–4°.

Two further recrystallizations raised the melting point to 169–9.5°.

*Analysis.*—Calc'd for $C_{14}H_{21}N_3O_3$: C, 60.19; H, 7.58; N, 15.04. Found: C, 60.43; H, 7.73; N, 14.86.

EXAMPLE 7 m-(3,3-dimethylureido)phenyl N-allylcarbamate

Following the procedure of Example 3, 3-(m-hydroxyphenyl)-1,1-dimethylurea was reacted with allyl isocyanate, to yield m-(3,3-dimethylureido)phenyl N-allylcarbamate, which on recrystallization from aqueous ethanol melted at 164–5°.

*Analysis.*—Calc'd for $C_{13}H_{17}N_3O_3$: C, 59.29; H, 6.50; N, 15.96. Found: C, 59.04; H, 6.19; N, 15.89.

EXAMPLE 8 m-(3,3-dimethylureido)phenyl N-(1,1,3,3-tetramethylbutyl)carbamate

The intermediate m-(3,3-dimethylureido)phenyl chloroformate was prepared as follows: A suspension of 180 g. of 3-(m-hydroxyphenyl)-1,1-dimethylurea, in 900 ml. of methanol, was added to 54 g. of sodium methoxide in 900 ml. of methanol. The methanol was distilled under vacuum and the solid was washed twice with benzene. This sodium salt of 3-(m-hydroxyphenyl)-1,1-dimethylurea (20.2 g.) was suspended in 300 ml. of ethyl acetate. The mixture was cooled to 0° and stirred vigorously as phosgene was bubbled in at the rate of 0.1 liter per minute for 26 minutes, maintaining the temperature between 0° and 5°. The reaction mixture was stirred for one-half hour after the addition of phosgene was complete, then filtered to remove the unreacted phenol salt and the sodium chloride formed. The filtrate was concentrated to dryness under vacuum to yield 12.8 g. of crude m(3,3-dimethylureido)phenyl chloroformate, melting at 93–5°.

This product was reacted with 1,1,3,3-tetramethylbutylamine as follows: The crude m-(3,3-dimethylureido)phenyl chloroformate (12.8 g.) was dissolved in 200 ml. of ethyl acetate and a solution of 14.2 g. of 1,1,3,3-tetramethylbutylamine in 50 ml. of ethyl acetate was added dropwise to the stirred solution. The mixture was stirred overnight and the amine hydrochloride which had precipitated was removed by filtration. The filtrate was concentrated to dryness under vacuum and the oily solid recrystallized three times from ethanol to yield m-(3,3-dimethylureido)phenyl N-(1,1,3,3-tetramethylbutyl)carbamate, melting at 125–6°.

*Analysis.*—Calc'd for $C_{18}H_{29}N_3O_3$: C, 64.45; H, 8.72; N, 12.53. Found: C, 64.42; H, 8.95; N, 12.38.

TABLE 3.—PRE-EMERGENCE HERBICIDAL ACTIVITY OF m-(3,3-DIALKYLUREIDO) PHENYL N-SUBSTITUTED-AND N,N-DISUBSTITUTED-CARBAMATES

| | Percent Kill at 6 lb./acre | | | | | | |
|---|---|---|---|---|---|---|---|
| | Example 2 | Example 3 | Example 4 | Example 5 | Example 6 | Example 7 | Example 8 |
| Test Plant Species: | | | | | | | |
| Crabgrass | 100 | 100 | 100 | 100 | 100 | 100 | 90 |
| Flax | 100 | 100 | | | | 100 | 100 |
| German hay millet | 100 | 100 | 100 | 100 | 100 | 100 | 25 |
| Mustard | 100 | 100 | 100 | 100 | 100 | 100 | |
| Chickweed | 100 | 100 | 100 | 100 | 100 | | 100 |
| Pigweed | 100 | | 100 | 100 | 100 | | 100 |
| Lettuce | | | 100 | 100 | 100 | 100 | 100 |

TABLE 4.—POST-EMERGENCE HERBICIDAL ACTIVITY OF m-(3,3-DIALKYLUREIDO) PHENYL N-SUBSTITUTED-AND N,N-DISUBSTITUTED-CARBAMATES

| | Percent Kill | | | | | |
|---|---|---|---|---|---|---|
| | Example 4, 1.5 lb./acre | Example 5, 0.5 lb./acre | Example 6, 0.5 lb./acre | Example 6, 0.5 lb./acre | Example 7, 1.5 lb./acre | Example 8, 1.5 lb./acre |
| Test Plant Species: | | | | | | |
| Crabgrass | 95 | 100 | 50 | 100 | 100 | 0 |
| Mustard | 95 | 100 | 100 | 100 | 100 | 100 |
| German hay millet | 100 | 100 | 70 | 100 | | 0 |
| Lettuce | 100 | 100 | 100 | 100 | 100 | |
| Flax | 100 | 30 | 0 | 90 | 0 | 100 |
| Pigweed | | 100 | 100 | 100 | 100 | 100 |
| Chickweed | | 100 | 100 | 100 | | 100 |
| Barnyard grass | | 100 | 10 | 100 | 100 | |

The following group of examples, Examples 9 through 15, illustrates the synthesis of additional novel compounds of this invention, particularly monoalkylureido- and thioureidophenyl N-mono- and N,N-disubstituted carbamates. Their herbicidal properties are reported in Tables 5 and 6, obtained following the general procedures described in Example 1.

EXAMPLE 9 m-(3-methylureido)phenyl N-methylcarbamate

Methyl isocyanate (12.5 g.) was added dropwise to a stirred solution of 10.9 g. of m-aminophenol and three drops of triethylamine in 75 ml. of dioxane. The temperature was maintained at 40° during the addition by means of an ice-water bath. Shortly after the addition of the isocyanate was complete a large amount of white waxy solid came out of solution. This precipitate was collected on a filter, pulverized and washed with hexane to yield 21.0 g.

of tan solid, melting at 157–60°. The crude m-(3-methyl-ureido)phenyl N-methylcarbamate was recrystallized twice from ethanol to give a product melting at 160–2°.

EXAMPLE 10 m-(3-methylureido)phenyl N-sec-butylcarbamate

The intermediate 1-(m-hydroxyphenyl)-3-methylurea was prepared as follows: Methyl isocyanate (14.25 g.) was added dropwise to a solution of 22.25 g. of m-aminophenol in 200 ml. of dioxane. The precipitate which formed was collected and dried to yield 36.0 g. of 3-(m-hydroxyphenyl)-1,1-dimethylurea, melting at 140–1°. A sample recrystallized from ethyl acetate for analysis melted at 141°.

*Analysis.*—Calc'd for $C_8H_{10}N_2O_2$: C, 57.83; H, 6.07; N, 16.86. Found: C, 57.81; H, 6.30; N, 16.65.

This product was reacted with sec-butyl isocyanate as follows: A mixture of 16.6 g. of 1-(m-hydroxyphenyl)-3-methylurea, 9.9 g. of sec-butyl isocyanate and five drops of triethylamine was heated at 60° for two hours. After cooling, the product was isolated by filtration, and recrystallized from ethanol to melt at 194–5°.

*Analysis.*—Calc'd for $C_{13}H_{19}N_3O_3$: C, 58.85; H, 7.22; N, 15.84. Found: C, 58.70; H, 7.21; N, 15.58.

EXAMPLE 11 m-(3-ethylureido)phenyl N-ethylcarbamate

1-Ethyl-3-(m-hydroxyphenyl)urea was prepared as follows: Eighteen grams of ethyl isocyanate was added to a solution of 27.3 g. of m-aminophenol in 100 ml. of dioxane and the mixture was refluxed for one hour. The product crystallized out on cooling. After filtration and drying, a yield of 45.5 g. of crude 1-ethyl-3-(m-hydroxyphenyl)urea, melting at 103–6°, was obtained. This product was reacted with ethyl isocyanate to yield m-(3-ethylureido)phenyl N-ethylcarbamate. On recrystallization from a carbon tetrachloride-ethyl acetate mixture it melted at 142.5–4.0°.

EXAMPLE 12 m-(3-methylureido)phenyl N,N-dimethylcarbamate

Following the procedure of Example 2, the sodium salt of 1-(m-hydroxyphenyl)-3-methylurea was prepared from 1-(m-hydroxyphenyl)-3-methylurea and sodium ethoxide, and reacted with dimethylcarbamoyl chloride to yield m-(3-methylureido)phenyl N,N-dimethylcarbamate. On recrystallization from benzene it melted at 119.5–20°.

*Analysis.*—Cal'd. for $C_{11}H_{15}N_3O_3$: C, 55.73; H, 6.37; N, 17.70. Found: C, 56.10; H, 6.20; N, 17.45.

EXAMPLE 13 m-(3-methyl-2-thioureido)phenyl N-methylcarbamate

Following the procedure of Example 10, 1-(m-hydroxyphenyl)-3-methyl-2-thiourea was prepared from m-aminophenol and methyl isothiocyanate. A solution of 7.0 g. of 1-(m-hydroxyphenyl)-3-methyl-2-thiourea, 3.0 g. of methyl isocyanate and three drops of triethylamine in 200 ml. of dioxane was heated to 60° on a water bath. The solvent was removed and the residual oil crystallized by trituration in chloroform. The crude m-(3-methyl-2-thioureido)phenyl N-methylcarbamate was recrystallized from ethyl acetate, to melt at 145.5–146.5°.

EXAMPLE 14 m-(3-propylureido)phenyl N-methylcarbamate

Following the procedure of Example 10, 1-(m-hydroxyphenyl)-3-propylurea was prepared from m-aminophenol and propyl isocyanate and reacted with methyl isocyanate to yield m-(3-propylureido)phenyl N-methylcarbamate, which on recrystallization from ethyl acetate melted at 140–2°.

EXAMPLE 15 m-(3-butylureido)phenyl N-methylcarbamate

Following the procedure of Example 10, 1-butyl-3-(m-hydroxyphenyl)urea was prepared from m-aminophenol and butyl isocyanate, and reacted with methyl isocyanate to yield m-(3-butylureido)phenyl N-methylcarbamate melting at 133–8°.

TABLE 5.—PRE-EMERGENCE HERBICIDAL ACTIVITY OF m-(3-ALKYLUREIDO AND THIOUREIDO)-PHENYL N-SUBSTITUTED AND N,N-DISUBSTITUTED CARBAMATES

| Test Plant Species | Percent Kill at 6 lb./acre | | | | | | |
| --- | --- | --- | --- | --- | --- | --- | --- |
| | Example 9 | Example 10 | Example 11 | Example 12 | Example 13 | Example 14 | Example 15 |
| Crabgrass | 100 | -------- | 90 | 50 | 80 | 25 | 100 |
| Flax | 100 | 100 | 100 | 100 | 100 | 95 | 30 |
| German hay millet | 100 | 100 | 100 | 95 | 20 | 20 | 100 |
| Mustard | 100 | 100 | 100 | 100 | 100 | 100 | 100 |
| Chickweed | 100 | 100 | 100 | 100 | 100 | 100 | 100 |
| Pigweed | 100 | 100 | 100 | 100 | -------- | 100 | 50 |

TABLE 6.—POST-EMERGENCE HERBICIDAL ACTIVITY OF m-(3-ALKYLUREIDO AND THIOUREIDO)-PHENYL N-SUBSTITUTED- AND N,N-DISUBSTITUTED CARBAMATES

| Test Plant Species | Percent Kill | | | | | | |
| --- | --- | --- | --- | --- | --- | --- | --- |
| | Example 9, 4 lb./acre | Example 10, 3 lb./acre | Example 11, 4 lb./acre | Example 12, 4 lb./acre | Example 13, 4 lb./acre | Example 14, 4 lb./acre | Example 15, 4 lb./acre |
| Crabgrass | 95 | 100 | 20 | 75 | 25 | 0 | 0 |
| Mustard | 100 | 100 | 100 | 100 | 100 | 100 | 100 |
| Germany hay millet | 100 | 100 | 10 | 95 | ------ | 0 | 20 |
| Lettuce | ------ | ------ | ------ | ------ | 100 | ------ | ------ |
| Pigweed | ------ | 100 | ------ | ------ | 90 | ------ | ------ |
| Chickweed | 100 | 100 | 100 | 100 | ------ | 95 | 100 |
| Yellow foxtail | 100 | ------ | 90 | 100 | ------ | 0 | 50 |

The following group of examples, Examples 16 through 22, illustrates the synthesis of additional novel compounds of this invention, including alkylureidophenyl carbamates which are alkyl-substituted in the 1,3-urea positions, as well as other new and useful compounds. The herbicidal properties of this group are presented in Tables 7 and 8, as obtained by the general test methods described in Example 1.

EXAMPLE 16 m-(1,3-dimethylureido)phenyl N-methylcarbamate

Following the procedure of Example 9, m-(methylamino)phenyl was reacted with methyl isocyanate to yield m-(1,3-dimethylureido)phenyl N-methylcarbamate, which on recrystallization from water melted at 162–4°.

EXAMPLE 17 m-(3-methylureido)phenyl cyclohexanecarbamate

A mixture of 16.6 g. of 1-(m-hydroxyphenyl)-3-methylurea, 12.5 g. of cyclohexyl isocyanate, and 5 drops of triethylamine was heated at 60° for one hour. After cooling, the product was isolated by filtration, and recrystallized from aqueous ethanol, to yield m-(3-methylureido) phenyl cyclohexanecarbamate melting at 187–8°.

Analysis.—Calc'd for $C_{15}H_{21}N_3O_3$: C, 61.84; H, 7.26; N, 14.42. Found: C, 62.04; H, 7.16; N, 14.23.

EXAMPLE 18 m-(3-methylureido)phenyl N-tert-butylcarbamate

Following the procedure of Example 10, 1-(m-hydroxyphenyl)-3-methyurea was reacted with tert-butyl isocyanate to yield m-(3-methylureido)phenyl N-tert-butylcarbamate, which on recrystallization from methanol melted at 171–2°.

Analysis.—Calc'd for $C_{13}H_{19}N_3O_3$: C, 58.85; H, 7.22; N, 15.84. Found: C, 58.74; H, 7.31; N, 15.78.

EXAMPLE 19 m-(3-methylureido)phenyl N-hexylcarbamate

A mixture of 16.6 g. of 1-(m-hydroxyphenyl)-3-methylurea, 12.7 g. of hexyl isocyanate, and 5 drops of triethylamine was heated at 60° for two hours. After cooling, the product was isolated by filtration and recrystallized from aqueous ethanol. The product was m-(3-methylureido)phenyl N-hexylcarbamate, melting at 136.0–136.5°.

Analysis.—Calc'd for $C_{15}H_{23}N_3O_3$: C, 61.41; H, 7.90; N, 14.33. Found: C, 61.62; H, 7.92; N, 14.22.

EXAMPLE 20 m-(3,3-dimethylureido)phenyl N-(2-methoxyethyl) carbamate

Following the procedure of Example 8, m-(3,3-dimethylureido)phenyl chloroformate was reacted with 2-methoxyethylamine to yield m-(3,3-dimethylureido)phenyl N-(2-methoxyethyl)carbamate, which on recrystallization from ethyl acetate melted at 129–130°.

Analysis.—Calc'd for $C_{13}H_{19}N_3O_4$: C, 55.50; H, 6.81. Found: C, 55.79; H, 6.67.

EXAMPLE 21 m-(3-methylureido)phenyl N-allylcarbamate

Following the procedure of Example 10, 1-(m-hydroxyphenyl)-3-methylurea was reacted with allyl isocyanate to yield m-(3-methylureido)phenyl N-allylcarbamate, which on recrystallization from aqueous ethanol melted at 148–9°.

Analysis.—Calc'd for $C_{12}H_{15}N_3O_3$: C, 57.81; H, 6.06; N, 16.85. Found: C, 57.97; H, 5.94; N, 16.87.

EXAMPLE 22 m-(3,3-dimethylureido)phenyl N-sec-butylcarbamate

A mixture of 18.0 g. of 3-(m-hydroxyphenyl)-1,1-dimethylurea, 9.9 g. of sec-butyl isocyanate, and 5 drops triethylamine was heated at 60° for two hours. After cooling, the product was isolated by filtration to yield m-(3,3-dimethylureido)phenyl N - sec - butylcarbamate, which on recrystallization from aqueous ethanol melted at 175–6°.

Analysis.—Calc'd for $C_{14}H_{21}N_3O_3$: C, 60.19; H, 7.58; N, 15.04. Found: C, 60.26; H, 8.11; N, 14.84.

TABLE 7.—PRE-EMERGENCE HERBICIDAL ACTIVITY OF m-UREIDOPHENYL CARBAMATES

| | Percent Kill at 6 lb./acre | | | | | | |
|---|---|---|---|---|---|---|---|
| | Example 16 | Example 17 | Example 18 | Example 19 | Example 20 | Example 21 | Example 22 |
| Test Plant Species: | | | | | | | |
| Crabgrass | 100 | 0 | 100 | | 100 | 100 | 100 |
| Flax | 100 | 40 | 100 | 75 | 100 | 100 | 100 |
| German hay millet | 80 | 25 | 100 | 60 | 100 | 100 | 100 |
| Mustard | 100 | 100 | 100 | 100 | | 100 | 100 |
| Chickweed | 100 | | | 100 | 100 | | 100 |
| Pigweed | 100 | | | | 100 | 100 | 100 |
| Curly dock | | 100 | | | | | |

TABLE 8.—POST-EMERGENCE HERBICIDAL ACTIVITY OF m-UREIDOPHENYL CARBAMATES

| | Percent Kill at 6 lb./acre | | | | | | |
|---|---|---|---|---|---|---|---|
| | Example 16 | Example 17 | Example 18 | Example 20 | Example 21 | Example 22 | |
| Test Plant Species: | | | | | | | |
| Crabgrass | 70 | | 100 | 0 | 100 | 100 | |
| Mustard | 100 | 100 | 100 | 100 | 100 | 100 | |
| German hay millet | 100 | 60 | | 10 | 100 | | |
| Lettuce | | 100 | 100 | | | 100 | |
| Flax | 100 | | 100 | 60 | 40 | 100 | |
| Pigweed | 100 | 100 | 100 | 100 | 100 | | |
| Chickweed | 100 | 100 | | | 20 | 100 | |
| Barnyard grass | | 95 | 100 | | | | |

Many other compounds of the class described may be synthesized employing the procedures described and illustrated above. Representative of such compounds are the specific examples listed below. These compounds, and others which fall within the generic formulae presented hereinabove, may be formulated into herbicidal compositions and applied as herein illustrated.

Example 23.—m(3-methylureido)phenyl N-butylcarbamate

Example 24.—m-(3-methylureido)phenyl N-propylcarbamate

Example 25.—m-(3,3-dimethylureido)phenyl N-hexylcarbamate

Example 26.—m-(3,3-dimethylureido)phenyl N-neopentyl-carbamate

Example 27.—m-(3-isopropyl-1-methylureido)phenyl N,N-diisopropylcarbamate

Example 28.—m-(3-ethylureido)phenyl N-methylcarbamate

Example 29.—m-(3-methylureido)phenyl N-2-propynyl-carbamate
Example 30.—m-(3,3-dimethylureido)phenyl N-2-propynylcarbamate
Example 31.—m-(3,3-dimethylureido)phenyl N-butyl-carbamate
Example 32.—m-(3-methylureido)phenyl N-isopropyl-carbamate
Example 33.—m-(3,3-dimethylureido)phenyl N-octyl-carbamate
Example 34.—m-(3-methylureido)phenyl N-ethylcarbamate
Example 35.—m-(3,3-dimethylureido)phenyl N-propyl-carbamate
Example 36.—m-(3,3-dimethylureido)phenyl N-(2-methylallyl)-carbamate
Example 37.—m-(1,3,3-trimethylureido)phenyl N-tert-butylcarbamate
Example 38.—m-(3,3-dimethyl-2-thioureido)phenyl N-2-propynylcarbamate
Example 39.—m-(3,3-dimethylureido)phenyl 4-morpholinecarboxylate
Example 40.—m-[(Piperidinocarbonyl)amino]phenyl N-ethylcarbamate
Example 41.—m-(3,3-dimethylureido)phenyl 1-piperidinecarboxylate
Example 42.—m-(3-tert-butylureido)phenyl N-tert-butyl-carbamate
Example 43.—m-(3,3-diethylureido)phenyl N,N-dimethylcarbamate
Example 44. m-(3,3-diethyl-2-thioureido)phenyl N-methcarbamate
Example 45.—m-(3,3-dimethylureido)phenyl cyclohexanecarbamate
Example 46.—m-(3,3-dimethylureido)phenyl N,N-dioctylcarbamate
Example 47.—m-(3,3-dimethylureido)phenyl cyclopropanecarbamate
Example 48.—m-(1,3-dimethylureido)phenyl N-isopropylcarbamate
Example 49.—m-(3-butyl-3-methylureido)phenyl N-tert-butylcarbamate
Example 50.—m-(3-isopropylureido)phenyl N-tert-butyl-carbamate
Example 51.—m-(3,3-diethylureido)phenyl N-tert-butyl-carbamate
Example 52.—m-(3-allylureido)phenyl N-tert-butylcarbamate
Example 53.—m-(3,3-dimethylureido)phenyl N,N-di-sec-butylcarbamate
Example 54.—m-(3-allyl-3-methylureido)phenyl N-methylcarbamate
Example 55.—m-(3-ethyl-3-methylureido)phenyl N-isopentylcarbamate
Example 56.—m-(3-cyclohexyl-3-methylureido)phenyl N-isopropylcarbamate
Example 57.—m-(3-diethylureido)phenyl N-2-propynyl-carbamate To illustrate the herbicidal properties of the compounds of Examples 23 to 57, Table 9 shows the excellent pre-emergence and post-emergence activity of a representative group of these compounds.

It is clear that the generic class of m-ureidophenyl carbamates described and illustrated herein is characterized by herbicidal activity, and that the degree of this activity varies among specific compounds within this class and to some extent among the species of plant to which these compounds may be applied. Thus, selection of a specific herbicidal compound for control of a specific plant may readily be made.

The active herbicidal compounds of this invention may be formulated and/or applied with insecticides, fungicides, nematocides, plant growth regulators, fertilizers, and other agricultural chemicals and may be used as effective soil sterilants as well as herbicidally. In applying an active compound of this invention, whether formulated alone or with other agricultural chemicals, an effective amount and concentration of the m-ureidophenyl carbamate is of course employed.

It is apparent that various modifications may be made in the formulation and application of the novel compounds of this invention, without departing from the inventive concepts herein, as defined in the following claims.

We claim:
1. Herbicidal compositions comprising as an essential active ingredient an effective herbicidal amount of a compound of the formula

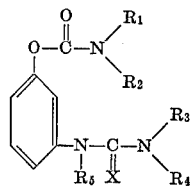

where $R_1$ and $R_3$ are each an aliphatic radical; $R_2$ and $R_4$ are each selected from the group consisting of hydrogen and an aliphatic radical; $R_5$ is selected from the group consisting of hydrogen and methyl; X is selected from the group consisting of oxygen and sulfur; and $R_1$ and $R_2$ may be joined to form a heterocyclic ring; and a carrier in admixture therewith.

2. Herbicidal compositions comprising as an essential active ingredient an effective herbicidal amount of a compound of the formula

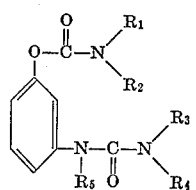

wherein $R_1$ and $R_3$ are each an aliphatic radical of one to about six carbon atoms, $R_2$ and $R_4$ are selected from the group consisting of hydrogen and an aliphatic radical of one to about six carbon atoms; $R_5$ is selected from the group consisting of hydrogen and methyl; and $R_1$ and $R_2$ may be joined to form a heterocyclic ring; and a carrier in admixture therewith.

3. Herbicidal compositions comprising as an essential

TABLE 9.—HERBICIDAL ACTIVITY OF m-UREIDOPHENYL CARBAMATES

| Test Plant Species | Percent Kill at 6 lb./acre | | | | | | |
|---|---|---|---|---|---|---|---|
| | Pre-emergence | | | | Post-emergence | | |
| | Example 30 | Example 39 | Example 43 | Example 51 | Example 26 | Example 36 | Example 46 |
| Crabgrass | 100 | 100 | 100 | 100 | ---------- | ---------- | 95 |
| Flax | ---------- | 100 | 100 | 100 | ---------- | ---------- | 100 |
| German hay millet | 100 | 100 | 100 | 100 | 100 | 100 | 100 |
| Mustard | 100 | 100 | 100 | 100 | 100 | 100 | 100 |
| Chickweed | 100 | 100 | ---------- | ---------- | 100 | 100 | ---------- |
| Pigweed | 100 | 100 | ---------- | ---------- | 100 | 100 | ---------- |
| Lettuce | 100 | ---------- | 100 | 100 | 100 | 100 | 100 |
| Barnyard grass | ---------- | ---------- | ---------- | ---------- | 100 | 100 | ---------- | active ingredient an effective herbicidal amount of a compound of the formula

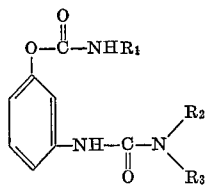

where $R_1$ and $R_2$ are each an aliphatic radical of one to about six carbon atoms, and $R_3$ is selected from the group consisting of hydrogen and an aliphatic radical of one to about six carbon atoms; and a carrier in admixture therewith.

4. Herbicidal compositions comprising as an essential active ingredient an effective herbicidal amount of a compound of the formula

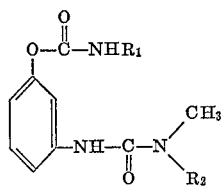

wherein $R_1$ is an aliphatic radical of one to about six carbon atoms, and $R_2$ is selected from the group consisting of hydrogen and methyl; and a carrier in admixture therewith.

5. Herbicidal compositions comprising as an essential active ingredient an effective herbicidal amount of a compound of the formula

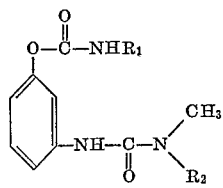

wherein $R_1$ is an aliphatic radical of up to six carbon atoms, having a branched chain, and $R_2$ is selected from the group consisting of hydrogen and methyl; and a carrier in admixture therewith.

6. Method of controlling undesired plant growth which comprises applying to the locus wherein control is desired a herbicidal amount of a compound of the formula

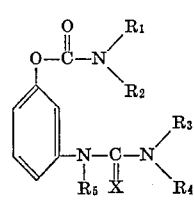

wherein $R_1$ and $R_3$ are each an aliphatic radical; and $R_2$ and $R_4$ are each selected from the group consisting of hydrogen and an aliphatic radical; $R_5$ is selected from the group consisting of hydrogen and methyl; X is selected from the group consisting of oxygen and sulfur; and $R_1$ and $R_2$ may be joined to form a heterocyclic ring.

7. Method of controlling undesired plant growth which comprises applying to the locus wherein control is desired a herbicidal amount of a compound of the formula

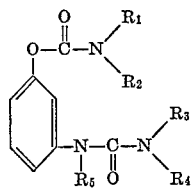

wherein $R_1$ and $R_3$ are each an aliphatic radical of one to about six carbon atoms, $R_2$ and $R_4$ are selected from the group consisting of hydrogen and an aliphatic radical of one to about six carbon atoms; $R_5$ is selected from the group consisting of hydrogen and methyl; and $R_1$ and $R_2$ may be joined to form a heterocyclic ring.

8. Method of controlling undesired plant growth which comprises applying to the locus wherein control is desired a herbicidal amount of a compound of the formula

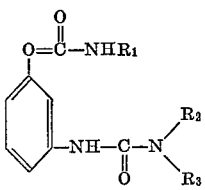

where $R_1$ and $R_2$ are each an aliphatic radical of one to about six carbon atoms, and $R_3$ is selected from the group consisting of hydrogen and an aliphatic radical of one to about six carbon atoms.

9. The method of claim 8, wherein $R_3$ is methyl.

10. The method of claim 8, wherein $R_3$ is ethyl.

11. Method of controlling undesired plant growth which comprises applying to the locus wherein control is desired a herbicidal amount of a compound of the formula

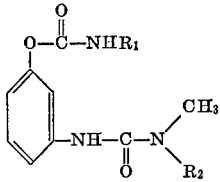

wherein $R_1$ is an aliphatic radical of four carbon atoms having a branched chain, and $R_2$ is selected from the group consisting of hydrogen and methyl.

12. Method of controlling undesired plant growth which comprises applying to the locus wherein control is desired a herbicidal amount of a compound of the formula

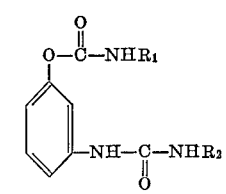

wherein $R_1$ is an aliphatic radical of one to about six carbon atoms and $R_2$ is an aliphatic radical of one to about four carbon atoms.

(References on following page)

References Cited

UNITED STATES PATENTS

| | | |
|---|---|---|
| 2,776,197 | 1/1957 | Gysin et al. |
| 2,709,648 | 5/1955 | Ryker et al. _____ 71—120 |
| 3,288,820 | 11/1966 | Argoudelis et al. ____ 260—553 |

OTHER REFERENCES

Anderson et al., Weeds, vol. 5, No. 3, pp. 135–137 (1957) SB 599W4.

LEWIS GOTTS, *Primary Examiner.*

G. HOLLRAH, *Assistant Examiner.*

U.S. Cl. X.R.

71—88, 94, 99, 120; 260—479, 482, 247.1, 247.2, 293.4, 294.3